Patented Dec. 16, 1947

2,432,521

UNITED STATES PATENT OFFICE 2,432,521

RENDERING CELLULOSE ESTERS RESISTANT TO ACTINIC RAYS

William Horback, Newark, and Walter D. Paist, Orange, N. J., assignors to Celanese Corporation of America, a corporation of Delaware No Drawing. Application October 12, 1944, Serial No. 558,454

17 Claims. (Cl. 117—144)

This invention relates to the treatment of plastic materials and relates more particularly to the treatment of shaped plastic materials having a basis of an organic acid ester of cellulose to render such materials resistant to the detrimental effects of light, particularly light which is rich in actinic rays.

An object of our invention is to provide a novel process for the treatment of thermoplastic materials having a basis of an organic acid ester of cellulose to render the same resistant to chemical and structural changes caused by exposure of such materials to light rich in actinic rays.

Another object of our invention is the provision of a novel process for the treatment of thermoplastic materials having a basis of an organic acid ester of cellulose to inhibit crazing and other disadvantageous changes which result when said cellulose ester materials are exposed to light.

Yet another object of our invention is the preparation of shaped organic acid ester of cellulose materials highly resistant to the detrimental action of the actinic rays of light.

A further object of our invention is to provide an economical and highly efficient process for treating shaped organic acid ester of cellulose materials whereby maximum surface protection is obtained with the minimum quantity of protective agent.

Other objects of our invention will appear from the following detailed description.

Shaped thermoplastic materials having a basis of an organic acid ester of cellulose tend to undergo certain detrimental changes in service when exposed to light rich in actinic rays, i. e. those rays which promote chemical changes and which are found in the violet and ultra-violet portions of the spectrum. When cellulose ester sheet material, for example, is exposed to these rays, for relatively prolonged periods, the surface of the material may craze, becoming a network of fine cracks, or discoloration, darkening, and the like, may result.

We have now discovered that shaped materials, such as filaments, films, foils, molded articles and the like, having a basis of an organic acid ester of cellulose may be subjected to a novel surface treatment and the undesirable effects on said materials of light rich in actinic rays may be substantially overcome by said treatment. In accordance with the process of our invention, this novel treatment comprises introducing an aryl ester of a hydroxy-aryl carboxylic acid into the surfaces only of the shaped cellulose ester material after the shaped material has been formed.

The introduction of the hydroxy-aryl carboxylic acid aryl ester into the surfaces of the shaped cellulose ester material may be effected by immersing the cellulose ester material in a bath comprising said hydroxy-aryl carboxylic acid aryl ester dissolved in a volatile liquid preferably having at least a solvent or swelling action on the cellulose ester material, or by applying to the surfaces of the shaped cellulose ester material, a lacquer composition comprising a film-forming material containing said hydroxy-aryl carboxylic acid aryl ester. The introduction of the latter ester in concentrated form into the surfaces only of the cellulose ester material serves to stabilize the material and prevent, to a substantial degree such undesirable changes as crazing, and such deterioration as is accompanied by the development of brittleness and discoloration, which changes normally result on exposure of said cellulose derivative materials to the actinic rays of light.

While our invention will be more particularly described in connection with the treatment of shaped cellulose acetate materials, other cellulose organic acid esters may be treated in like manner to render the same substantially resistant to any change on exposure to light. Examples of other organic acid esters of cellulose are, cellulose propionate, cellulose butyrate, and mixed esters such as cellulose acetate-propionate and cellulose acetate-butyrate.

Examples of aryl esters of hydroxy-aryl carboxylic acids which may be incorporated as stabilizers into the surfaces of the cellulose ester materials in accordance with the process of our invention are phenyl salicylate, cresyl salicylate, benzyl salicylate and like esters. Optimum results are achieved, however, when employing phenyl salicylate.

When employing solutions of the desired hydroxy-aryl carboxylic acid aryl ester in liquids having a solvent, swelling or penetrating action on the cellulose ester materials, the solutions employed may contain from 10 to 75% by weight of the ester. The shaped cellulose ester materials in either seasoned or partially seasoned form, if formed with the acid of active solvents or in a form initially free of solvents and made by mixing the cellulose ester and plasticizer in a Banbury mixer or on converting rolls, may be immersed therein for 5 to 60 seconds with the solution at 15 to 50° C. and the shaped material may then be removed and the volatile solvent permitted to evaporate. Plate polishing under heat may be employed as a final treatment to give the surfaces of the sheets a smoother and brighter finish and eliminate any undesirable crystallization of the agent on the surface. Vaporizing the treated sheet with solvents such as acetone is also found desirable to offset this tendency of the agent to crystallize on the surface.

When a lacquer containing the hydroxy-aryl carboxylic acid aryl ester is employed for applying said ester to the surfaces of the shaped cellulose ester material, the lacquer may comprise any suitable film-forming material together with solvents, plasticizers and synthetic resins compatible with the cellulose derivative employed. The resins may be added to impart increased toughness to the resulting film, while the plasticizers impart to said film increased flexibility. In such applications, the hydroxy-aryl carboxylic acid aryl ester may comprise from 2 to 20% by weight of the lacquer composition. Various film-forming materials may be employed but preferably we employ a film-forming material having a basis of a derivative of cellulose such as, for example, those cellulose esters of which the base material may be formed. Other film-forming materials which may be employed are polyvinyl acetate, copolymers of polyvinyl chloride and polyvinyl acetate, polymerized acrylic acid esters, e. g. methyl methacrylate, as well as polymerized styrene and derivatives thereof. Suitable solvents which may be employed in formulating the lacquer are ethyl acetate, acetone, ethyl lactate, tetrachlorethane, the methyl ether of ethylene glycol, benzyl alcohol, diacetone alcohol, dioxane, methyl alcohol and benzene or suitable mixtures of two or more of these solvents. More or less solvent may be employed depending upon the extent to which it is desired to soften the surface of the cellulose derivative material to permit the aryl ester to penetrate the same.

The synthetic resins which may be added to impart toughness to the lacquer film containing the aryl ester are, for example, diethylene glycolphthalic anhydride resins, toluene sulfonamide-formaldehyde resins, polymerized vinyl and acrylic resins.

Suitable plasticizers which may be employed to impart the desired flexibility to the coating include dimethyl phthalate, diethyl phthalate, tricresyl phosphate, triphenyl phosphate, monomethyl toluene sulfonamide, triacetin, tripropionin, dimethoxy ethyl phthalate, dibutyl tartrate and methyl phthalyl ethyl glycollate. The lacquer may be applied by spraying, dipping, brushing, flowing, etc. and one or more coats may be applied depending upon the thickness of the film and penetration desired.

In order further to illustrate our invention but without being limited thereto the following examples are given:

*Example I*

A cellulose acetate sheet 0.125 inch in thickness containing 30% by weight of a mixture of diethyl phthalate and triphenyl phosphate in the ratio of 2 to 1 is immersed in a bath of the following composition:

| | Parts by weight |
|---|---|
| Phenyl salicylate | 15 |
| Acetone | 85 |

The bath is maintained at room temperature and the sheet immersed therein for 20 seconds. The sheet is then removed, drained, the acetone permitted to evaporate, and the sheet is then plate polished after exposure for a few seconds to acetone vapors.

On alternate exposure to ultra-violet light from a mercury vapor lamp and to artificial fog for 240 hours employing a cycle comprising 2 hours in the fog chamber, 2 hours irradiation, 2 hours in the fog chamber and 18 hours irradiation in accordance with Naval Aeronautical Specification P-41-C, Amendment 1, Dec. 4, 1942, the treated and surface-protected sheet material shows no crazing or other signs of deterioration such as discoloration, viscosity break-down, surface unmolding, exudation, etc. Untreated sheet material on like exposure suffers considerable crazing, develops brittleness and exhibits a pronounced loss of strength and viscosity breakdown.

*Example II*

A cellulose acetate sheet 0.125 inch in thickness, formed by mixing 100 parts by weight of cellulose acetate, 18 parts of diethyl phthalate and 10 parts of triphenyl phosphate on converting rolls without the use of active solvents, and suitably shaping the converted mixture obtained, is immersed for 35 seconds in a 25% solution of phenyl salicylate in acetone at room temperature. The dipped sheets are removed, drained and the acetone allowed to evaporate. The sheet material prepared in this way shows no sign of any surface crazing or other deterioration after a 240-hour exposure to the weathering cycle of Example I and only begins to show an incipient sign of crazing after exposure for over 400 hours.

*Example III*

A cellulose acetate sheet 0.050 inch in thickness, seasoned or partially seasoned, is dipped or spray-coated with a lacquer of the following composition:

| | Parts by weight |
|---|---|
| Phenyl salicylate | 100 |
| Celluloce acetate | 100 |
| Acetone | 700–1000 or Q. S. for spraying or dipping consistency |

The surface-coated sheet material after drying and polishing is exposed to ultra-violet light from a mercury vapor lamp for 240 hours and shows no signs of crazing or deterioration. Uncoated cellulose acetate sheet material exposed side by side with the coated material suffers considerable crazing and other deteriorative changes.

*Example IV*

A cellulose acetate fabric is partly immersed in a bath comprising a 10% solution of phenyl salicylate in ethyl alcohol (2B formula) for two minutes at room temperature. The wet portion of the fabric is dried and then the whole fabric is exposed to the accelerated weathering test for 240 hours. The untreated part of the fabric becomes brittle and discolored and breaks upon creasing. The treated portion shows no discoloration or brittleness.

Our novel surface treatment is not only more economic but yields strikingly superior results in the prevention of surface crazing and chemical deterioration and offers substantial advantages in that the hydroxy-aryl carboxylic acid aryl esters do not react with the plasticizers present in the cellulose ester composition under the relatively mild coating conditions we employ. When incorporated in the body of the cellulose ester materials during the preparation of the sheet or molding materials, where the cellulose ester materials are subjected to the action of relatively high temperatures, the hydroxy-aryl carboxylic acid aryl esters react with the cellulose esters as well as with the plasticizers such as triphenyl phosphate and cause discoloration as well as a viscosity break-down of the cellulose ester materials.

The surface-treated sheets and films prepared in accordance with our invention find useful application where protection against exposure to light is desired, such as for airplane windows, cock-pit enclosures, laminated glass, lamp shades, light domes, light diffusers, screens, fabrics, illuminating signs and displays.

It is to be understood that the foregoing detailed description is given merely by way of illustration and that many variations may be made therein without departing from the spirit of our invention.

Having described our invention, what we desire to secure by Letters Patent is:

1. Process for the treatment of shaped organic acid ester of cellulose materials to render the same highly resistant to changes normally effected by the action of light rays, which comprises introducing an aryl ester of salicylic acid into the surfaces of a shaped organic acid ester of cellulose material.

2. Process for the treatment of shaped cellulose acetate materials to render the same highly resistant to changes normally effected by the action of light rays, which comprises introducing an aryl ester of salicylic acid into the surfaces of a shaped cellulose acetate material.

3. Process for the treatment of shaped organic acid ester of cellulose materials to render the same highly resistant to changes normally effected by the action of the actinic rays of light, which comprises introducing an aryl ester of salicylic acid into the surfaces of a shaped organic acid ester of cellulose material by immersing the shaped cellulose ester material in a solution comprising an aryl ester of salicylic acid and a solvent having at least a swelling action on the cellulose ester material, whereby the aryl ester is caused to enter the surfaces of the cellulose ester material.

4. Process for the treatment of shaped cellulose acetate materials to render the same highly resistant to changes normally effected by the action of the actinic rays of light, which comprises introducing an aryl ester of salicylic acid into the surfaces of a shaped cellulose acetate material by immersing the shaped cellulose acetate material in a solution comprising an aryl ester of a salicylic acid and a solvent having at least a swelling action on the cellulose acetate material, whereby the aryl ester is caused to enter the surfaces of the cellulose acetate material.

5. Process for the treatment of shaped cellulose acetate materials to render the same highly resistant to changes normally effected by the action of the actinic rays of light, which comprises introducing an aryl ester of salicylic acid into the surfaces of a shaped cellulose acetate material by applying a lacquer composition having a basis of a film-forming material and containing an aryl ester of salicylic acid to the surfaces of said cellulose acetate material.

6. Process for the treatment of shaped cellulose acetate materials to render the same highly resistant to changes normally effected by the action of the actinic rays of light, which comprises introducing an aryl ester of salicylic acid into the surfaces of a shaped cellulose acetate material by applying a lacquer composition having a basis of an organic acid ester of cellulose material and containing an aryl ester of a hydroxy-aryl carboxylic acid to the surfaces of said cellulose acetate material.

7. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in a solution comprising phenyl salicylate and a solvent having at least a swelling action on the cellulose acetate material, whereby the phenyl salicylate is caused to enter the surfaces of the cellulose material.

8. Process for the treatment of shaped cellulose acetate materials to render the same highly resistant to changes normally effected by the action of the actinic rays of light, which comprises introducing phenyl salicylate into the surfaces of a shaped cellulose acetate material by applying a lacquer composition having a basis of cellulose acetate and containing phenyl salicylate to the surfaces of said shaped cellulose acetate material.

9. Process for the treatment of shaped cellulose acetate materials to render the same highly resistant to changes normally effected by the actinic rays of light, which comprises introducing an aryl ester of salicylic acid into the surfaces of a shaped cellulose acetate material by immersing the shaped cellulose acetate material in a solution comprising from 10 to 75% by weight of an aryl ester of salicylic acid in a solvent having at least a swelling action on the cellulose acetate material, whereby the aryl ester of a hydroxy-aryl carboxylic acid is caused to enter the surfaces of the cellulose acetate material.

10. Process for the treatment of shaped cellulose acetate materials to render the same highly resistant to changes normally effected by the action of the actinic rays of light, which comprises introducing an aryl ester of salicylic acid into the surfaces of a shaped cellulose acetate material by applying a lacquer composition having a basis of an organic acid ester of cellulose material and containing from 2 to 20% by weight of an aryl ester of salicylic acid to the surfaces of said cellulose acetate material.

11. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in a solution comprising from 10 to 75% by weight of phenyl salicylate in a solvent having at least a swelling action on the cellulose acetate material, whereby the phenyl salicylate is caused to enter the surfaces of the cellulose material.

12. Process for the treatment of cellulose acetate sheet materials to render the same highly resistant to changes normally effected by the action of the actinic rays of light, which comprises introducing phenyl salicylate into the surfaces of a shaped cellulose acetate material by immersing the shaped cellulose acetate material in a solution comprising from 10 to 75% by weight of phenyl salicylate in a solvent having at least a swelling action on the cellulose acetate material, whereby the phenyl salicylate is caused to enter the surfaces of the cellulose material, exposing the treated sheet materials to solvent vapors, and plate-polishing the resulting cellulose acetate sheet material.

13. Process for the treatment of shaped cellulose acetate materials to render the same highly resistant to changes normally effected by the action of the actinic rays of light, which comprises introducing phenyl salicylate into the surfaces of a shaped cellulose acetate material by applying a lacquer composition having a basis of cellulose acetate and containing from 2 to 20% by weight of phenyl salicylate to the surfaces of said shaped cellulose acetate material.

14. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate, whereby the phenyl salicylate is caused to enter the surfaces of the cellulose acetate material.

15. Process for the treatment of cellulose acetate sheet materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate, whereby the phenyl salicylate is caused to enter the surfaces of the cellulose acetate material, exposing the treated sheet materials to acetone vapors and plate-polishing the resulting cellulose acetate sheet material.

16. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate for 5 to 60 seconds, whereby the phenyl salicylate is cause to enter the surfaces of the cellulose acetate material.

17. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate for 5 to 60 seconds at 15 to 50° C., whereby the phenyl salicylate is caused to enter the surfaces of the cellulose acetate material.

WILLIAM HORBACK.
WALTER D. PAIST.

REFERENCES CITED

The following references are of record in the file of this patent:

UNITED STATES PATENTS

| Number | Name | Date |
|---|---|---|
| 1,193,178 | Mork | Aug. 1, 1916 |
| 1,319,229 | Lindsay | Oct. 21, 1919 |
| 2,086,418 | Hunt | July 6, 1937 |
| 2,128,902 | Bass | Sept. 6, 1938 |

OTHER REFERENCES

Meyer Ind. & chem., vol. 37, No. 3, pp. 232 and 239.

S. P. I., Special Insert, Modern Plastics Magazine, Mar. 1943, page 98–B.

---

Certificate of Correction

Patent No. 2,432,521.  December 16, 1947.

WILLIAM HORBACK ET AL.

It is hereby certified that errors appear in the printed specification of the above numbered patent requiring correction as follows: Column 6, lines 3 and 4, claim 6, for "a hydroxy-aryl carboxylic" read *salicylic*; column 7, line 11, claim 13, for "pheynl" read *phenyl*; and that the said Letters Patent should be read with these corrections therein that the same may conform to the record of the case in the Patent Office.

Signed and sealed this 6th day of April, A. D. 1948.

[SEAL]

THOMAS F. MURPHY,
*Assistant Commissioner of Patents.* polishing the resulting cellulose acetate sheet material.

13. Process for the treatment of shaped cellulose acetate materials to render the same highly resistant to changes normally effected by the action of the actinic rays of light, which comprises introducing phenyl salicylate into the surfaces of a shaped cellulose acetate material by applying a lacquer composition having a basis of cellulose acetate and containing from 2 to 20% by weight of pheynl salicylate to the surfaces of said shaped cellulose acetate material.

14. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate, whereby the phenyl salicylate is caused to enter the surfaces of the cellulose acetate material.

15. Process for the treatment of cellulose acetate sheet materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate, whereby the phenyl salicylate is caused to enter the surfaces of the cellulose acetate material, exposing the treated sheet materials to acetone vapors and plate-polishing the resulting cellulose acetate sheet material.

16. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate for 5 to 60 seconds, whereby the phenyl salicylate is cause to enter the surfaces of the cellulose acetate material.

17. Process for the treatment of shaped cellulose acetate materials to render the same highly resistant to changes normally effected by the action of the actinic rays of light, which comprises introducing phenyl salicylate into the surfaces of a shaped cellulose acetate material by immersing the shaped cellulose acetate material in an acetone solution containing from 10 to 75% by weight of phenyl salicylate for 5 to 60 seconds at 15 to 50° C., whereby the phenyl salicylate is caused to enter the surfaces of the cellulose acetate material.

WILLIAM HORBACK.
WALTER D. PAIST.

REFERENCES CITED

The following references are of record in the file of this patent:

UNITED STATES PATENTS

| Number | Name | Date |
|---|---|---|
| 1,193,178 | Mork | Aug. 1, 1916 |
| 1,319,229 | Lindsay | Oct. 21, 1919 |
| 2,086,418 | Hunt | July 6, 1937 |
| 2,128,902 | Bass | Sept. 6, 1938 |

OTHER REFERENCES

Meyer Ind. & chem., vol. 37, No. 3, pp. 232 and 239.

S. P. I., Special Insert, Modern Plastics Magazine, Mar. 1943, page 98-B.

---

Certificate of Correction

Patent No. 2,432,521. December 16, 1947.

WILLIAM HORBACK ET AL.

It is hereby certified that errors appear in the printed specification of the above numbered patent requiring correction as follows: Column 6, lines 3 and 4, claim 6, for "a hydroxy-aryl carboxylic" read *salicylic*; column 7, line 11, claim 13, for "pheynl" read *phenyl*; and that the said Letters Patent should be read with these corrections therein that the same may conform to the record of the case in the Patent Office.

Signed and sealed this 6th day of April, A. D. 1948.

[SEAL]

THOMAS F. MURPHY,
*Assistant Commissioner of Patents.*